(12) United States Patent
Xu et al.

(10) Patent No.: US 10,502,998 B2
(45) Date of Patent: Dec. 10, 2019

(54) TOUCH SENSOR, METHOD OF MANUFACTURING THE SAME, TOUCH SCREEN, AND ELECTRONIC PRODUCT

(71) Applicants: BOE Technology Group Co., Ltd., Beijing (CN); Hefei Xinsheng Optoelectronics Technology Co., Ltd., Anhui (CN)

(72) Inventors: Jiawei Xu, Beijing (CN); Lei Zhang, Beijing (CN); Tsung-Chieh Kuo, Beijing (CN); Ming Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 63 days.

(21) Appl. No.: 15/544,611

(22) PCT Filed: Jan. 10, 2017

(86) PCT No.: PCT/CN2017/070721
§ 371 (c)(1),
(2) Date: Jul. 19, 2017

(87) PCT Pub. No.: WO2017/211085
PCT Pub. Date: Dec. 14, 2017

(65) Prior Publication Data
US 2018/0210256 A1    Jul. 26, 2018

(30) Foreign Application Priority Data

Jun. 7, 2016 (CN) .......................... 2016 1 0397236

(51) Int. Cl.
*G02F 1/1333* (2006.01)
*G02F 1/1335* (2006.01)
(Continued)

(52) U.S. Cl.
CPC .... *G02F 1/13338* (2013.01); *G02F 1/133512* (2013.01); *G06F 3/044* (2013.01);
(Continued)

(58) Field of Classification Search
CPC ........... G02F 1/13338; G02F 1/133512; G06F 3/044; G06F 3/0412; G06F 3/047; G06F 2203/04103; G06F 2203/04111
See application file for complete search history.

(56) References Cited

U.S. PATENT DOCUMENTS

2015/0036064 A1* 2/2015 Zhou ................... G06F 3/0412
349/12
2015/0277186 A1* 10/2015 Zou ..................... G02F 1/13338
345/174
(Continued)

FOREIGN PATENT DOCUMENTS

CN    101571779 A    11/2009
CN    201503581 U    6/2010
(Continued)

OTHER PUBLICATIONS

International Search Report and Written Opinion for International Application No. PCT/CN2017/070721, dated Apr. 11, 2017, 10 pages.
(Continued)

*Primary Examiner* — Aneeta Yodichkas
(74) *Attorney, Agent, or Firm* — Westman, Champlin & Koehler, P.A.

(57) ABSTRACT

Embodiments of the present invention disclose a touch sensor, a method of manufacturing the touch sensor, and a touch screen and an electronic product which include the touch sensor. The touch sensor includes: a substrate; a blocking pattern formed on the substrate; and a metal bridge. The blocking pattern is formed in a region corresponding to the metal bridge on the substrate and is configured to block the metal bridge.

20 Claims, 5 Drawing Sheets

(51) Int. Cl.
*G06F 3/047* (2006.01)
*G06F 3/044* (2006.01)
*G06F 3/041* (2006.01)

(52) U.S. Cl.
CPC ............ *G06F 3/047* (2013.01); *G06F 3/0412* (2013.01); *G06F 2203/04103* (2013.01); *G06F 2203/04111* (2013.01)

(56) References Cited

U.S. PATENT DOCUMENTS

2016/0342239 A1 11/2016 Xie et al.
2017/0038870 A1* 2/2017 Lin .................. G09G 5/003

FOREIGN PATENT DOCUMENTS

| CN | 202735998 U | 2/2013 |
| CN | 104331201 A | 2/2015 |
| CN | 104714683 A | 6/2015 |
| CN | 106095172 A | 11/2016 |
| WO | WO2015043219 | * 5/2014 |

OTHER PUBLICATIONS

English translation of International Search Report and Box. V of the Written Opinion for International Application No. PCT/CN2017/070721, dated Apr. 11, 2017, 17 pages.
First Office Action from Chinese Patent Application No. 201610397236.2, dated Dec. 5, 2017, 12 pages.
Office Action, including Search Report, for Chinese Patent Application No. 201610397236.2, dated May 2, 2018, 12 pages.

* cited by examiner

TOUCH SENSOR, METHOD OF MANUFACTURING THE SAME, TOUCH SCREEN, AND ELECTRONIC PRODUCT

CROSS-REFERENCE TO RELATED APPLICATIONS

This application is a Section 371 National Stage Application of International Application No. PCT/CN2017/070721, filed on 10 Jan. 2017, entitled "TOUCH SENSOR, METHOD OF MANUFACTURING THE SAME, TOUCH SCREEN, AND ELECTRONIC PRODUCT", which has not yet published, which claims priority to Chinese Application No. 201610397236.2, filed on 7 Jun. 2016, incorporated herein by reference in their entirety.

BACKGROUND

1. Technical Field

Embodiments of the present invention relate to a touch sensor, a method of manufacturing the touch sensor, and a touch screen and an electronic product which include the touch sensor.

2. Description of the Related Art

At present, a metal bridge is widely applied in a one-glass solution (OGS) type touch screen, an on-cell type touch screen, and an in-cell type touch screen. However, a visual effect will be affected due to a high reflectivity of the metal bridge.

SUMMARY

Embodiments of the present invention provide a touch sensor comprising: a substrate; a blocking pattern formed on the substrate; and a metal bridge, wherein the blocking pattern is formed in a region corresponding to the metal bridge on the substrate and is configured to block the metal bridge.

According to embodiments of the present invention, the blocking pattern is formed of a black photoresist or a black metal oxide material.

According to embodiments of the present invention, the touch sensor further comprises: a black matrix frame disposed on the substrate, located in the same layer as the blocking pattern, and formed of the same material as the blocking pattern.

According to embodiments of the present invention, a projection of the metal bridge on the substrate is a first projection, a projection of the blocking pattern on the substrate is a second projection, and the first projection is located within a range of the second projection.

According to embodiments of the present invention, both a shape and a size of the blocking pattern are the same as a shape and a size of the metal bridge.

According to embodiments of the present invention, the touch sensor further comprises: a first transparent insulating layer formed on the metal bridge; and a touch identification pattern, wherein the touch identification pattern is formed on the first transparent insulating layer and on a portion of the substrate which is not covered by the first transparent insulating layer, and comprises a first wiring and a second wiring which cross each other at a crossing, wherein the metal bridge is disposed at the crossing of the first wiring and the second wiring to connect wiring segments of the first wiring which are separated at the crossing.

According to embodiments of the present invention, the touch sensor further comprises: a second transparent insulating layer formed over the touch identification pattern.

According to embodiments of the present invention, the touch sensor further comprises: a touch identification pattern and a first transparent insulating layer, wherein the touch identification pattern is formed on the blocking pattern and on a portion of the substrate which is not covered by the blocking pattern, and comprises a first wiring and a second wiring which cross each other at a crossing, the first transparent insulating layer is formed on a portion of the first wiring corresponding to the metal bridge, and the metal bridge is disposed at the crossing of the first wiring and the second wiring on the first transparent insulating layer to connect wiring segments of the second wiring which are separated at the crossing.

According to embodiments of the present invention, the touch sensor further comprises: a second transparent insulating layer formed over the touch identification pattern and the metal bridge.

According to embodiments of the present invention, the touch identification pattern is formed of an indium tin oxide (ITO) material.

Embodiments of the present invention provide a method of manufacturing a touch sensor, and the method comprises: forming a blocking pattern on the substrate; and forming a metal bridge blocked by the blocking pattern.

According to embodiments of the present invention, the method further comprises: forming a black matrix frame on the substrate, before the forming the blocking pattern on the substrate, or between the forming the blocking pattern on the substrate and the forming the metal bridge.

According to embodiments of the present invention, the black matrix frame is formed while the blocking pattern is formed on the substrate, and the black matrix frame is formed of the same material as the blocking pattern.

According to embodiments of the present invention, the forming the black matrix frame while the blocking pattern is formed on the substrate comprises: applying a black photoresist material to the substrate to form a black photoresist material layer; and forming a black photoresist pattern by exposing and developing processes, wherein the black photoresist pattern comprises a black photoresist-retained region comprising the black matrix frame and the blocking pattern, and a black photoresist-removed region.

According to embodiments of the present invention, the forming the metal bridge comprises: forming the metal bridge on the blocking pattern, and, the method further comprises: forming a first transparent insulating layer on the metal bridge; and forming a touch identification pattern on the first transparent insulating layer and on a portion of the substrate which is not covered by the first transparent insulating layer, the touch identification pattern comprises a first wiring and a second wiring which cross each other at a crossing, and the metal bridge is disposed at the crossing of the first wiring and the second wiring to connect wiring segments of the first wiring which are separated at the crossing.

According to embodiments of the present invention, the method further comprises: forming a second transparent insulating layer on the touch identification pattern.

According to embodiments of the present invention, the method further comprises: forming a touch identification pattern on the blocking pattern and on a portion of the substrate which is not covered by the blocking pattern before the forming the metal bridge, the touch identification pattern comprising a first wiring and a second wiring which cross each other at a crossing; and, forming a first transparent insulating layer on a portion of the first wiring corresponding to the metal bridge, wherein the forming the metal bridge comprises forming the metal bridge at the crossing of the first wiring and the second wiring on the first transparent insulating layer to connect wiring segments of the second wiring which are separated at the crossing.

Embodiments of the present invention provide a touch screen comprising: the abovementioned touch sensor, an optical clear resin/optical clear adhesive (OCR/OCA) layer, and a liquid crystal display (LCD) module which are arranged in sequence.

According to embodiments of the present invention, the touch screen is a one-glass solution (OGS) type touch screen, an on-cell type touch screen, or an in-cell type touch screen.

Embodiments of the present invention provide an electronic product comprising the abovementioned touch screen.

DETAILED DESCRIPTION OF THE EMBODIMENTS

The objects, technical solutions and advantages of the present invention will be apparent and more readily appreciated from the following description of embodiments taken in conjunction with the accompanying drawings.

It is to be noted that like elements are indicated by like reference signs throughout the accompanying drawings. In the following description, some specific embodiments are provided as only examples of the embodiments of the present invention for description, and should not be interpreted as any limitation on the present invention. Routine structures or configurations will be omitted if they will probably confuse understanding of the present invention. It is noted that shapes and sizes of the parts shown in the figures do not reflect real sizes and proportions, but only schematically illustrate contents of the embodiments of the present invention.

Figure 1:
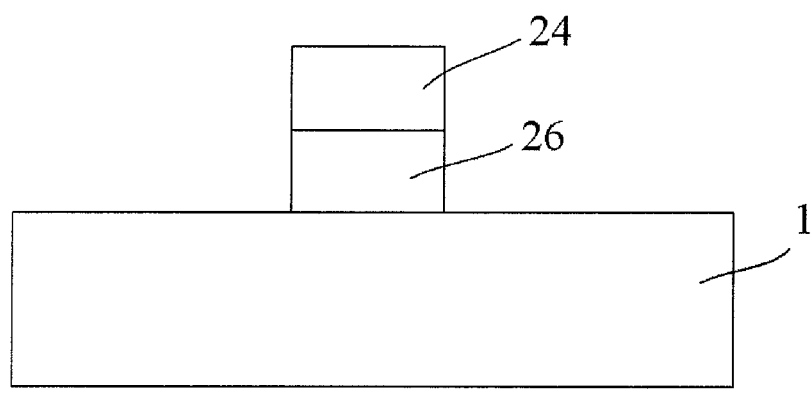
FIG. 1 is a schematic view showing a structure of a touch sensor according to an embodiment of the present invention.

As shown in FIG. 1, a touch sensor according to an embodiment of the present invention comprises: a substrate 1; a blocking pattern 26 formed on the substrate 1; and a metal bridge 24. The blocking pattern 26 is formed in a region corresponding to the metal bridge 24 on the substrate 1 and is configured to block the metal bridge 24. The blocking pattern 26 may be formed of a material having a low reflectivity. For example, the blocking pattern 26 may be formed of a light absorbing material and a material having a low surface reflectivity. In the embodiment of the present invention, due to existence of the blocking pattern, no reflected light stimulating human eyes will be generated by the metal bridge when light is irradiated inwards from an outside through the substrate (which may be for example a glass substrate). In contrast, if no blocking pattern exists, reflected light stimulating human eyes will be generated when light is irradiated onto the metal bridge. In the embodiment of the present invention, besides the blocking pattern being formed of a black photoresist or a black metal oxide material (such as CrO, CuO, and the like), the blocking pattern may also be formed of another material such as a low-reflectivity material (for example, $Al_2O_3$, ZnO and the like), which can also prevent the metal bridge from reflecting light to a certain extent. Therefore, in the embodiments of the present invention, the materials of the blocking pattern are not limited to those listed in the description.

According to embodiments of the present invention, the touch sensor further comprises:

a black matrix frame disposed on the substrate, located in the same layer as the blocking pattern, and formed of the same material as the blocking pattern. With the above technical solution, during manufacturing, technological steps can be saved, efficiency can be improved, and cost can be reduced.

According to embodiments of the present invention, a projection of the metal bridge on the substrate is a first projection, a projection of the blocking pattern on the substrate is a second projection, and the first projection is located within a range of the second projection. With the above technical solution, reflection of light by the metal bridge can be further reduced.

According to embodiments of the present invention, both a shape and a size of the blocking pattern are the same as a shape and a size of the metal bridge. For example, the first projection coincides with the second projection. With the above technical solution, it can be ensured to prevent the metal bridge from reflecting light while a normal passage of light of a light source through the touch sensor is not affected.

Figure 2:
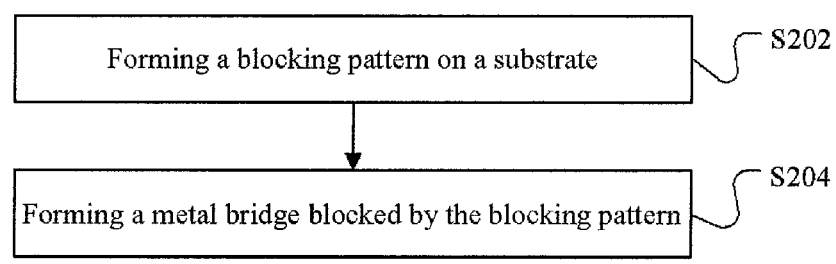
FIG. 2 is a flow diagram of a method of manufacturing a touch sensor according to an embodiment of the present invention.

As shown in FIG. 2, a method of manufacturing the abovementioned touch sensor, according to an embodiment of the present invention, comprises: a step S202 of forming a blocking pattern on the substrate; and a step S204 of forming a metal bridge blocked by the blocking pattern.

The touch sensor according to the embodiments of the present invention may be applied to various types of common touch screens, such as a one-glass solution (OGS) type touch screen, an on-cell type touch screen, or an in-cell type touch screen. The OGS type touch screen will be hereinafter taken as an exemplary example. It could be appreciated by those skilled in the art that the touch sensor according to the embodiments of the present invention may be similarly manufactured for the on-cell type touch screen or the in-cell type touch screen.

It is to be noted that processes such as plating, exposing, developing, and etching, to which specific operational steps in the following embodiments are related are all routine technical means well-known by those skilled in the art. Therefore, technological details of these processes are no longer described for the sake of brevity.

Figure 3:
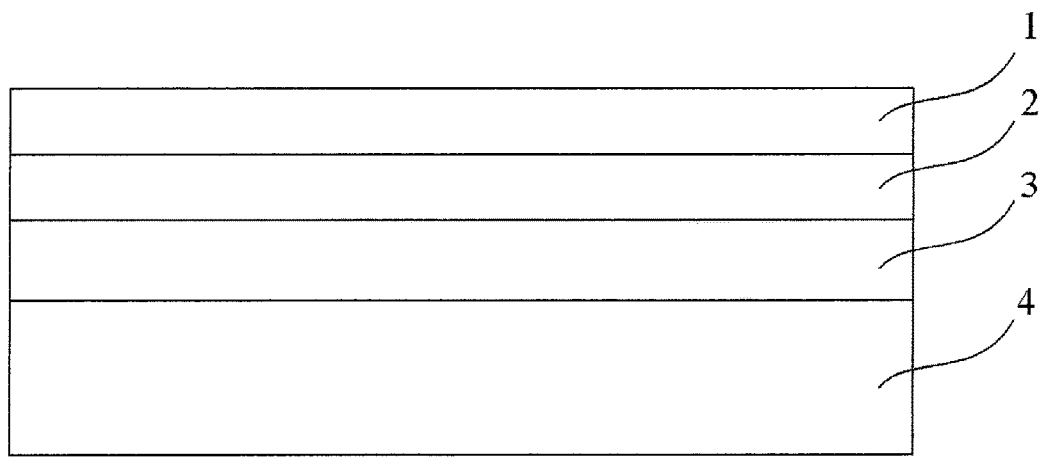
FIG. 3 is a schematic view showing a structure of a capacitive touch sensor according to an embodiment of the present invention.

FIG. 3 is a schematic view showing a structure of a capacitive touch screen. The touch screen comprises the touch sensor according to the embodiments of the present invention. Specifically, the touch screen comprises a substrate 1, a touch sensor 2, an OCR/OCA layer 3, and an LCD module (LCM) 4. The substrate 1 is a protective glass. The substrate 1 functions to protect the entire touch screen. The OCR/OCA layer 3 functions to adhere the LCD module 4 and the touch sensor 2 to each other. The LCD module 4 is an assembly in which a liquid crystal display device, a connecting member, a peripheral circuit such as a control and drive circuit and the like, a printed circuit board (PCB), a backlight source, a structural member, and the like are assembled together.

Figure 4:
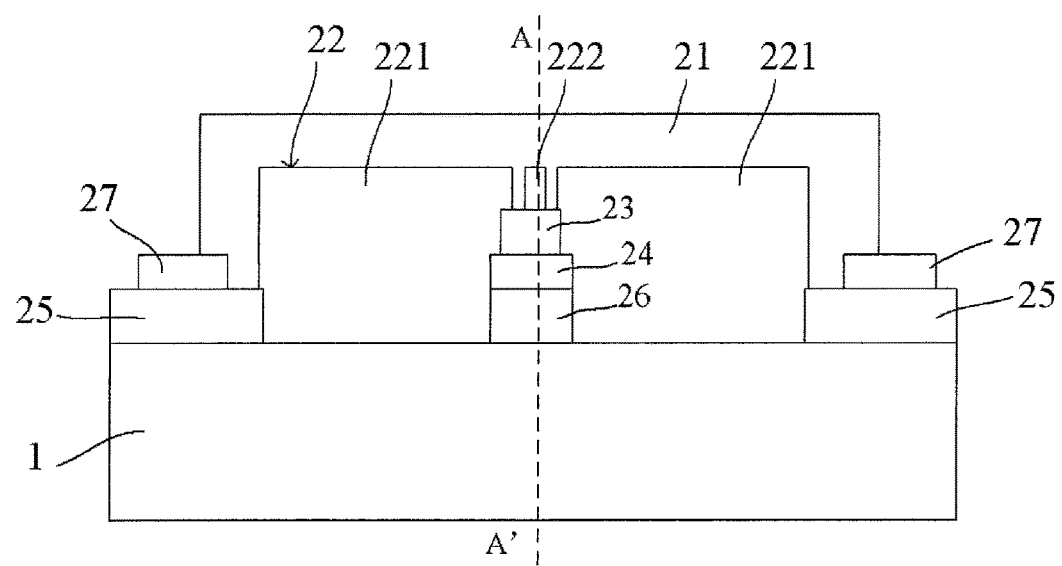
FIG. 4 is a schematic view showing details of a structure at a metal bridge in a touch sensor according to an embodiment of the present invention.
Figure 5:
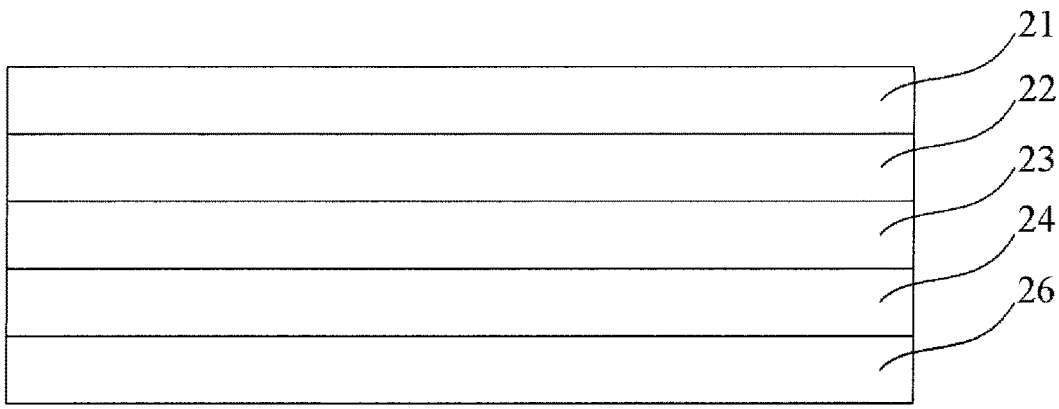
FIG. 5 is a schematic sectional view taken along the line A-A' in FIG. 4.

FIG. 4 and FIG. 5 are schematic views showing a structure of the touch sensor 2, disposed on the substrate 1, according to an embodiment of the present invention. FIG. 4 is a schematic view showing details of a structure at a metal bridge 24, and FIG. 5 is a schematic sectional view taken along the line A-A in FIG. 4. The structure of the touch sensor 2 according to the embodiment of the present invention will now be further described in conjunction with FIG. 4 and FIG. 5. The touch sensor 2 further comprises: a first transparent insulating layer 23 formed on the metal bridge 24; and a touch identification pattern 22 (for example, an ITO touch identification pattern 22). The touch identification pattern 22 is disposed on the first transparent insulating layer 23 and on a portion of the substrate 1 which is not covered by the first transparent insulating layer 23, and the touch identification pattern 22 comprises a first wiring 221 and a second wiring 222 which cross each other at a crossing. The metal bridge 24 is disposed at the crossing of the first wiring 221 and the second wiring 222 to connect wiring segments of the first wiring 221 which are separated at the crossing. A blocking pattern 26 is disposed between the metal bridge 24 and the substrate 1. The touch sensor 2 further comprises: a black matrix (BM) frame 25 disposed on the substrate 1, located in the same layer as the blocking pattern 26, and formed of the same material as the blocking pattern 26. Furthermore, a shape and a size of the blocking pattern 26 are the same as a shape and a size of the metal bridge 24. Therefore, by photolithography, the blocking pattern 26 having the same shape and size as the metal bridge 24 is formed while the BM frame 25 is manufactured. By means of a low reflectivity and light absorbing property of the BM material, a reflectivity at the metal bridge 24 is the same as a reflectivity of a black background of the LCD module after the metal bridge 24 is attached, and the metal bridge 24 is invisible under natural light. In addition, since the blocking pattern 26 and the metal bridge 24 have the same size, this display screen has the same effect as that having no blocking pattern 26 when an entire apparatus is in an illuminated state.

For convenient description, a layer where the metal bridge 24 is located is hereinafter referred to as a metal layer, and a layer where the BM frame 25 and the blocking pattern 26 are located is hereinafter named as a BM layer. Further, it can be seen from FIG. 5 that, the BM layer is located under the metal layer, the first transparent insulating layer 23 is located between the ITO touch identification pattern 22 and the metal layer, and the uppermost one is the second transparent insulating layer 21 serving as a protective layer. After the metal bridge is attached according to the structure shown in FIG. 5, a reflectivity at the metal bridge 24 is the same as a reflectivity of a background of the LCD module and thus the metal bridge 24 is invisible due to existence of the blocking pattern 26 when irradiated by light. In other words, a user will no longer see bright spots generated due to reflection of light by the metal bridge 24 in use. In addition, a metal wiring 27 is also invisible since it is blocked by the BM frame 25.

Figure 6:
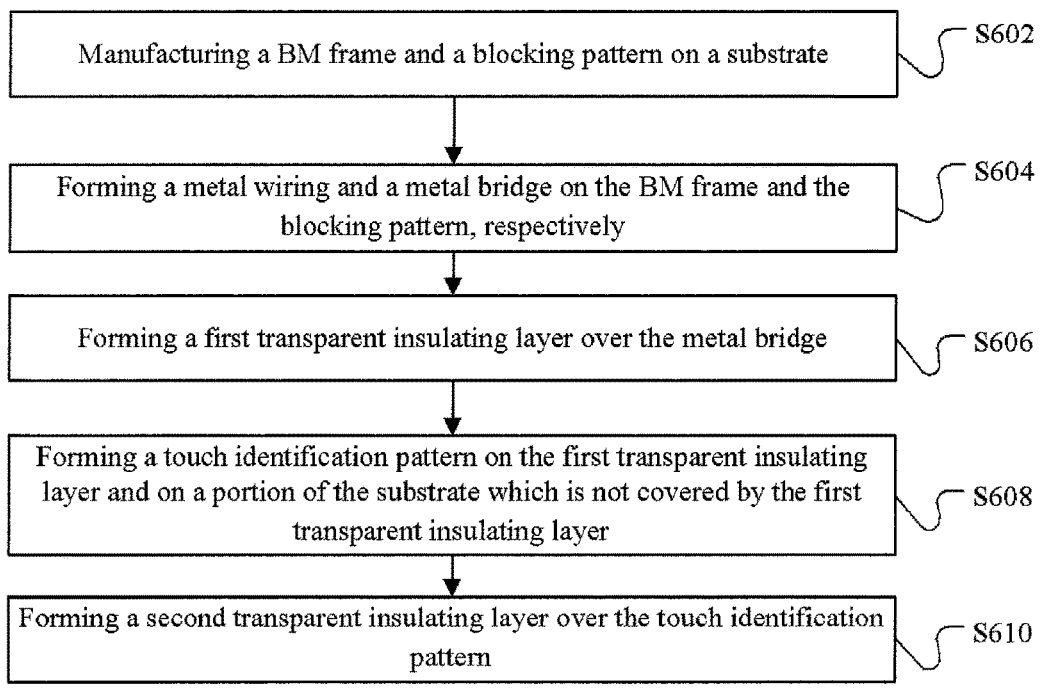
FIG. 6 is a flow diagram of a method of manufacturing a touch sensor according to an embodiment of the present invention.

A specific process flow of the touch sensor 2 according to this embodiment will now be specifically described in conjunction with FIG. 4, FIG. 5 and FIG. 6. The touch sensor 2 may be manufactured on the substrate 1 layer by layer by means of a yellow-light photolithography process.

In a step S602, a BM frame 25 and a blocking pattern 26 are manufactured on the substrate 1. A position of the blocking pattern 26 is the same as a preset position of a metal bridge 24.

The BM frame 25 and the blocking pattern 26 are manufactured by photolithography. Since the BM frame 25 and the blocking pattern 26 are formed of the same material, the manufactures of the BM frame 25 and the blocking pattern 26 can be completed in the same step. The BM frame 25 and the blocking pattern 26 may be formed of a black photoresist.

Specifically, the black photoresist is applied to the substrate 1, and a black photoresist pattern is formed by processes including an exposure and a development. The black photoresist pattern comprises a black photoresist-retained region and a black photoresist-removed region. The black photoresist-retained region is the BM layer of the touch screen, i.e. a layer where the BM frame 25 and the blocking pattern 26 are located.

In a step S604, a metal wiring 27 and the metal bridge 24 are formed on the BM layer.

In this step, a metal film layer is plated by magnetron sputtering, then a photoresist layer is applied, and next the photoresist layer is exposed and developed, thereby forming a photoresist pattern on the metal film. The photoresist-retained region is a region where the metal wiring 27 and the metal bridge 24 to be formed are located, and the photoresist-removed region is a region where the metal needs to be etched away. The metal in the photoresist-removed region is removed by an acid solution. Finally, the photoresist is removed. Thereby the required metal wiring 27 and metal bridge 24 are formed. The metal bridge 24 is located over the blocking pattern 26. A shape and a size of the metal bridge 24 are the same as a shape and a size of the blocking pattern 26.

In a step S606, a first transparent insulating layer 23 is formed over the metal bridge 24.

In this step, a layer of transparent insulating material is applied, and the insulating layer over the metal bridge 24 is formed by exposing and developing.

In a step S608, a touch identification pattern 22 (for example, an ITO touch identification pattern 22) is formed on the first transparent insulating layer 23 and on a portion of the substrate 1 which is not covered by the first transparent insulating layer 23. The touch identification pattern 22 comprises a first wiring 221 and a second wiring 222 which cross each other at a crossing. The metal bridge 24 is disposed at the crossing of the first wiring 221 and the second wiring 222 to connect wiring segments of the first wiring 221 which are separated at the crossing.

This step specifically comprises plating, exposing, developing, and etching processes, and a specific operation of this step is similar to the process for forming the metal wiring 27 and the metal bridge 24 in the step S604 except difference between components of etching acid solutions used in the two steps. The difference could be known by those skilled in the art in a specific operation and is no longer described herein for the sake of brevity.

In a step S610, a second transparent insulating layer 21 is formed over the touch identification pattern 22.

In this step, a layer of insulating material is applied, and an insulating protective layer is formed by exposing and developing, for protecting the touch sensor and a wiring region.

In the embodiment of the present invention, a low reflectivity and a light absorbing effect of the black BM material are utilized and the blocking pattern 26 having the same shape as the metal bridge 24 is formed at the metal bridge 24 by photolithography. Therefore, it is not necessary to consider an influence of a high reflectivity of the metal bridge. A reflectivity at the metal bridge 24 is the same as that of a black background of the LCD module after the metal bridge 24 is attached, so that the metal bridge 24 is invisible. The embodiment of the present invention has advantages that cost is low, technology is simple, a resistance of the metal will not be affected, it is not necessary to change an existing process, and the like, compared with a metal blackening process.

Figure 7:
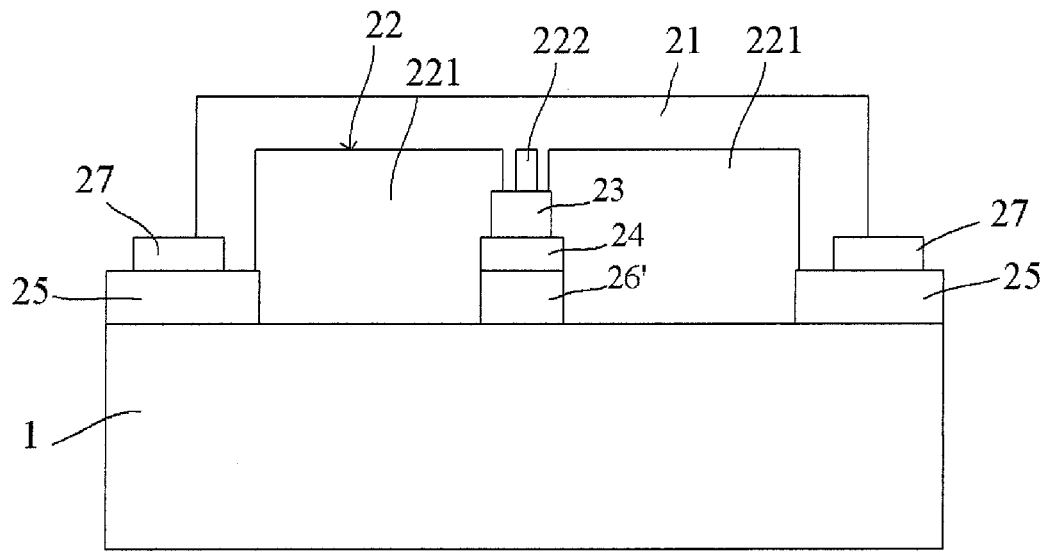
FIG. 7 is a schematic view showing details of a structure at a metal bridge in a touch sensor according to another embodiment of the present invention.

FIG. 7 is a schematic view showing a structure of a touch sensor, disposed on a protective glass, according to another embodiment of the present invention. The touch sensor according to this embodiment is substantially the same as that shown in FIG. 4, but is different from that shown in FIG. 4 in that a material of a blocking pattern 26' between a metal bridge 24 and a substrate 1 is different from a material of a BM frame 25. The material of the blocking pattern 26' in this embodiment is a low-reflectivity material different from the material of the BM frame 25. This type of material may be for example a low-reflectivity metal oxide: CrO, CuO or the like. Like in the embodiment shown in FIG. 4, since a shape and a size of the blocking pattern 26' are the same as a shape and a size of the metal bridge 24, and the blocking pattern 26' has a low reflectivity and light absorbing property, a reflectivity at the metal bridge 24 is the same as a reflectivity of a black background of the LCD module after the metal bridge 24 is attached, and the metal bridge 24 is invisible under natural light. In addition, since the blocking pattern 26' and the metal bridge 24 have the same size, the display screen has the same effect as that having no blocking pattern 26' when an entire apparatus is in an illuminated state.

Figure 8:
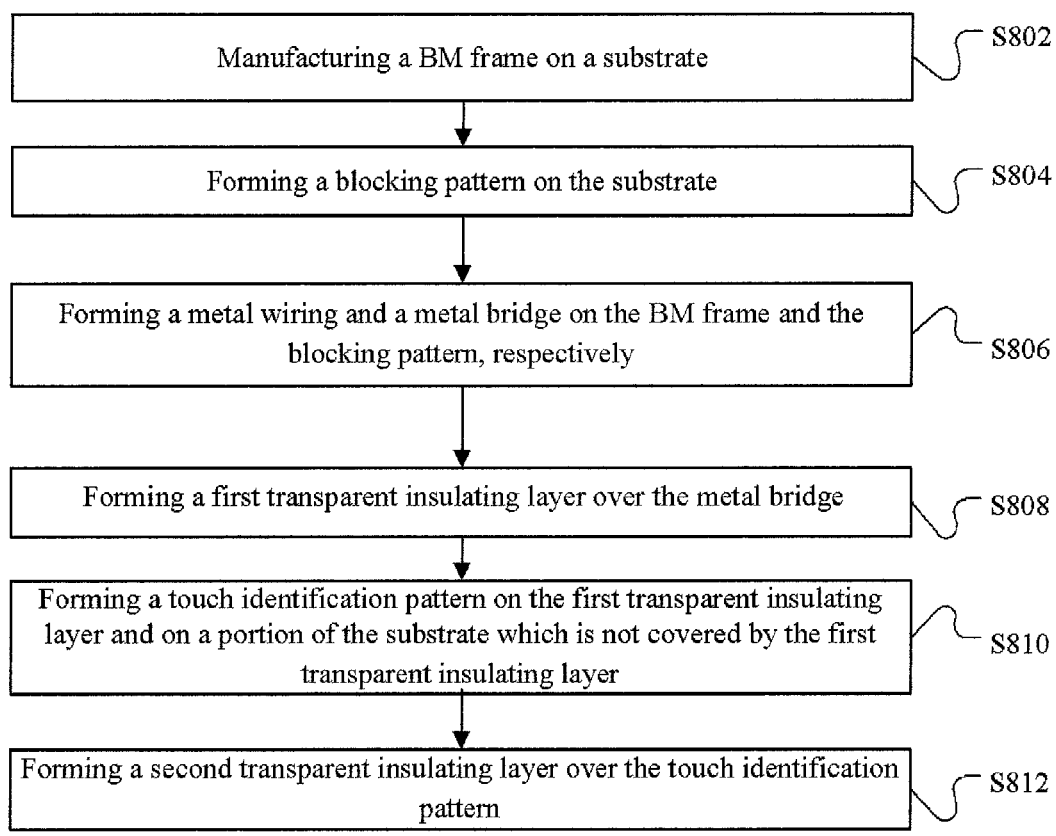
FIG. 8 is a flow diagram of a method of manufacturing a touch sensor according to another embodiment of the present invention.

A specific process flow of the touch sensor according to this embodiment will now be specifically described in conjunction with FIG. 7 and FIG. 8.

In a step S802, a BM frame 25 is manufactured on a substrate.

In this step, firstly the BM frame 25 is formed by photolithography. A black photoresist may be selected as a BM material. The black photoresist is applied to a protective glass. A black photoresist pattern is formed by processes including an exposure and a development. The black photoresist pattern comprises a black photoresist-retained region and a black photoresist-removed region. The black photoresist-retained region is the BM layer of the touch screen, i.e. a layer where the BM frame 25 and the blocking pattern 26' are located.

In a step S804, the blocking pattern 26' of the low-reflectivity material is formed on the substrate. A position of the blocking pattern 26' corresponds to a preset position of a metal bridge 24. A shape and a size of the blocking pattern 26' are the same as a shape and a size of the metal bridge 24, and the blocking pattern 26' has the same thickness as the BM frame 25.

In this embodiment, a material of the blocking pattern 26' is CrO, or may also be another low-reflectivity metal oxide such as CuO or the like. Firstly, a metal film layer is plated by magnetron sputtering, then a photoresist layer is applied, and next the photoresist layer is exposed and developed, thereby forming a photoresist pattern on the metal film. The photoresist-retained region is a region where the blocking pattern 26' of the low-reflectivity material to be formed is located, and the photoresist-removed region is a region where the metal needs to be etched away. The metal in the photoresist-removed region is removed by an acid solution. Finally, the photoresist is removed. Thereby the required low-reflectivity blocking pattern 26' is formed.

In a step S806, a metal wiring 27 and the metal bridge 24 are formed on the BM layer. The metal bridge 24 is located over the blocking pattern 26', and the metal wiring is located over the BM frame 25.

A metal film layer is plated by magnetron sputtering, then a photoresist layer is applied, and next the photoresist layer is exposed and developed, thereby forming a photoresist pattern on the metal film. The photoresist-retained region is a region where the metal wiring 27 and the metal bridge 24 to be formed are located, and the photoresist-removed region is a region where the metal needs to be etched away. The metal in the photoresist-removed region is removed by an acid solution. Finally, the photoresist is removed. Thereby the metal wiring 27 and the metal bridge 24 are formed.

In a step S808, a first transparent insulating layer 23 is formed over the metal bridge 24.

In this step, a layer of insulating material is applied, and the insulating layer over the metal bridge 24 is formed by exposing and developing.

In a step S810, a touch identification pattern 22 (for example, an ITO touch identification pattern 22) is formed on the first transparent insulating layer 23, and on a portion of the substrate 1 which is not covered by the first transparent insulating layer 23. The touch identification pattern 22 comprises a first wiring 221 and a second wiring 222 which cross each other at a crossing. The metal bridge 24 is disposed at the crossing of the first wiring 221 and the second wiring 222 to connect wiring segments of the first wiring 221 which are separate at the crossing.

This step specifically comprises plating, exposing, developing, and etching processes, and a specific operation of this step is similar to the process for forming the metal wiring 27 and the metal bridge 24 in the step S604 except difference between components of etching acid solutions used in the two steps. The difference could be known by those skilled in the art in a specific operation and is no longer described herein for the sake of brevity.

In a step S812, a second transparent insulating layer 21 is formed over the touch identification pattern 22.

In this step, a layer of insulating material is applied, and an insulating protective layer is formed by exposing and developing, for protecting the touch sensor and a wiring region.

A sequence in which the steps S802 and S804 are performed is not necessarily particularly limited. It has no influence on the entire process and the technical effect of the embodiments of the present invention to exchange the steps S802 and S804 in sequence.

Figure 9:
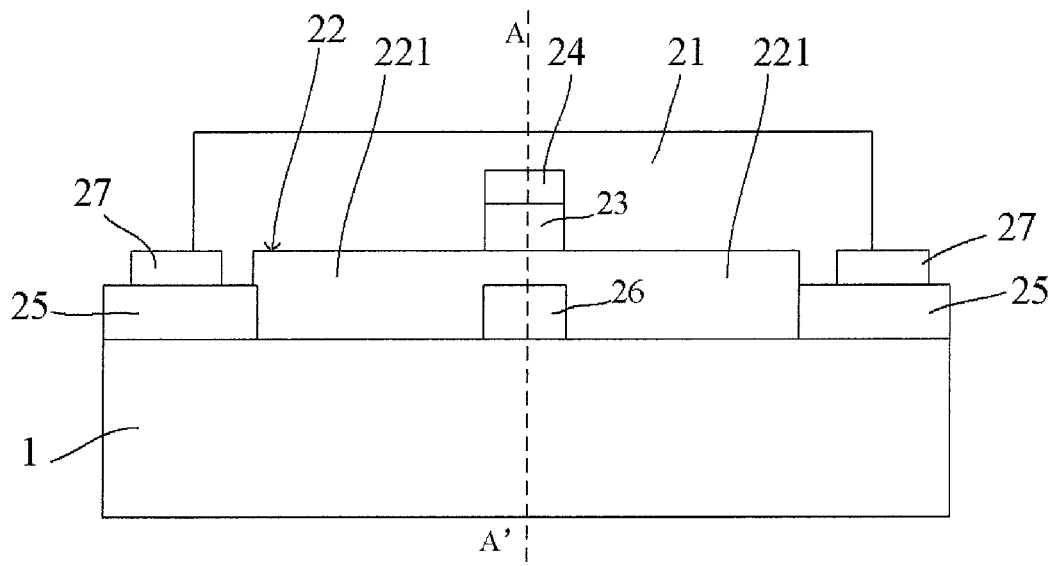
FIG. 9 is a schematic view showing details of a structure at a metal bridge in a touch sensor according to a further embodiment of the present invention.

FIG. 9 is a schematic view showing a structure of a touch sensor, disposed on a protective glass, according to a further embodiment of the present invention. The touch sensor 2 further comprises: a touch identification pattern 22 and a first transparent insulating layer 23. The touch identification pattern 22 is formed on the blocking pattern 26 and on a portion of the substrate 1 which is not covered by the blocking pattern 26, and comprises a first wiring 221 and a second wiring which cross each other at a crossing, the first transparent insulating layer 23 is formed on a portion of the first wiring 221 corresponding to the metal bridge 24, and the metal bridge 24 is disposed at the crossing of the first wiring 221 and the second wiring on the first transparent insulating layer 23 to connect wiring segments of the second wiring which are separated at the crossing. The touch sensor 2 further comprises: a black matrix (BM) frame 25 disposed on the substrate 1, located in the same layer as the blocking pattern 26, and formed of the same material as the blocking pattern 26. Furthermore, a shape and a size of the blocking pattern 26 are the same as a shape and a size of the metal bridge 24. Therefore, by photolithography, the blocking pattern 26 having the same shape and size as the metal bridge 24 is formed while the BM frame 25 is manufactured. By means of a low reflectivity and light absorbing property of the BM material, a reflectivity at the metal bridge 24 is the same as a reflectivity of a black background of the LCD module after the metal bridge 24 is attached, and the metal bridge 24 is invisible under natural light. In addition, since the blocking pattern 26 and the metal bridge 24 have the same size, the screen has the same effect as that having no blocking pattern 26 when an entire apparatus is in an illuminated state.

It can be seen from FIG. 9 that the uppermost one is the second transparent insulating layer 21 serving as a protective layer. After the metal bridge is attached according to the structure shown in FIG. 5, a reflectivity at the metal bridge 24 is the same as a reflectivity of a background of the LCD module and thus the metal bridge 24 is invisible due to existence of the blocking pattern 26 when irradiated by light. In other words, a user will no longer see bright spots generated due to reflection of light by the metal bridge 24 in use. In addition, a metal wiring 27 is also invisible since it is blocked by the BM frame 25.

Figure 10:
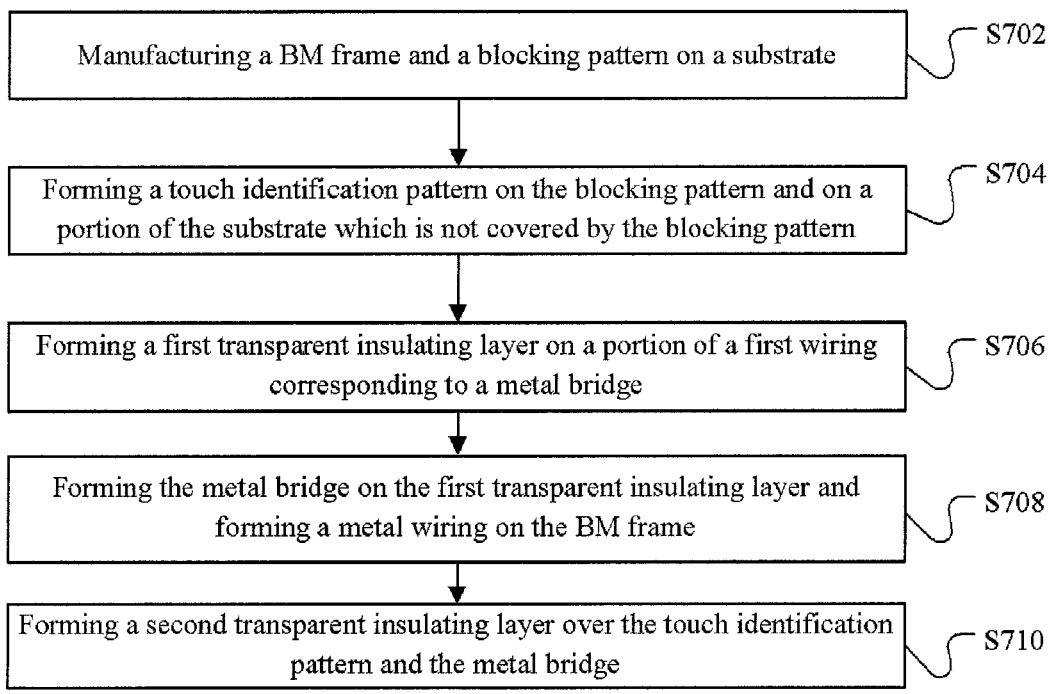
FIG. 10 is a flow diagram of a method of manufacturing a touch sensor according to a further embodiment of the present invention.

A specific process flow of the touch sensor 2 according to this embodiment will now be specifically described in conjunction with FIG. 9 and FIG. 10. The touch sensor 2 may be manufactured on the substrate 1 layer by layer by means of a yellow-light photolithography process.

In a step S702, a BM frame 25 and a blocking pattern 26 are manufactured on the substrate 1. A position of the blocking pattern 26 is the same as a preset position of a metal bridge 24.

The BM frame 25 and the blocking pattern 26 are manufactured by photolithography. Since the BM frame 25 and the blocking pattern 26 are formed of the same material, the manufactures of the BM frame 25 and the blocking pattern 26 can be completed in the same step. The BM frame 25 and the blocking pattern 26 may be formed of a black photoresist.

Specifically, the black photoresist is applied to the substrate 1, and a black photoresist pattern is formed by processes including an exposure and a development. The black photoresist pattern comprises a black photoresist-retained region and a black photoresist-removed region. The black photoresist-retained region is the BM layer of the touch screen, i.e. a layer where the BM frame 25 and the blocking pattern 26 are located.

In a step S704, a touch identification pattern 22 (for example an ITO touch identification pattern 22) is formed on the blocking pattern 26 and on a portion of the substrate 1 which is not covered by the blocking pattern 26. The touch identification pattern 22 comprises: a first wiring 221 and a second wiring which cross each other at a crossing.

In a step S706, a first transparent insulating layer 23 is formed on a portion of the first wiring 221 corresponding to the metal bridge 24.

In this step, a layer of transparent insulating material is applied, and the insulating layer on the portion of the first wiring 221 corresponding to the metal bridge 24 is formed by exposing and developing.

In a step S708, the metal bridge 24 is formed at the crossing of the first wiring 221 and the second wiring on the first transparent insulating layer 23 to connect wiring segments of the second wiring which are separate at the crossing; and a metal wiring 27 is formed on the BM frame 25.

In this step, a metal film layer is plated by magnetron sputtering, then a photoresist layer is applied, and next the photoresist layer is exposed and developed, thereby forming a photoresist pattern on the metal film. The photoresist-retained region is a region where the metal wiring 27 and the metal bridge 24 to be formed are located, and the photoresist-removed region is a region where the metal needs to be etched away. The metal in the photoresist-removed region is removed by an acid solution. Finally, the photoresist is removed. Thereby the required metal wiring 27 and metal bridge 24 are formed. The metal bridge 24 is located over the blocking pattern 26. A shape and a size of the metal bridge 24 may be the same as a shape and a size of the blocking pattern 26.

In a step S710, a second transparent insulating layer 21 is formed over the touch identification pattern 22 and the metal bridge 24.

In this step, a layer of insulating material is applied, and an insulating protective layer is formed by exposing and developing, for protecting the touch sensor and a wiring region.

In the embodiment of the present invention, a low reflectivity and a light absorbing effect of the black BM material are utilized and the blocking pattern 26 having the same shape as the metal bridge 24 is formed at the metal bridge 24 by photolithography. Therefore, it is not necessary to consider an influence of a high reflectivity of the metal bridge. A reflectivity at the metal bridge 24 is the same as that of a black background of the LCD module after the metal bridge 24 is attached, so that the metal bridge 24 is invisible. The embodiment of the present invention has advantages that cost is low, technology is simple, a resistance of the metal will not be affected, it is not necessary to change an existing process, and the like.

The above is the embodiments of the present invention. In fact, whether or not there is a BM frame on the protective glass, a blocking pattern of a low-reflectivity material may be disposed between the metal bridge and the protective glass according to the embodiments of the present invention, so that a reflectivity at the metal bridge is relatively low and is the same as that of a black background of the LCD module. As a result, the metal bridge is invisible under natural light and resistance of the metal is not changed. In other words, when there is no BM frame on the protective glass, the metal bridge can also be blocked by provision of the blocking pattern. In the case where there is the BM frame on the protective glass, like in the embodiment shown in FIG. 7, the material of the blocking pattern may also be different from that of the BM frame (which means that the BM frame and the blocking pattern need to be manufactured in two technological steps, respectively). Of course, if the material of the blocking pattern is the same as that of the BM frame, manufactures of the BM frame and the blocking pattern may be completed in a single process step (like that in the embodiment shown in FIG. 7). In this way, process steps and cost can be saved.

In addition, it is not necessary that the shape and the size of the blocking pattern are the same as the shape and the size of the metal bridge, like those in the abovementioned embodiments. In fact, the shape and the size of the blocking pattern may be slightly different from the shape and the size of the metal bridge. For example, the size of the blocking pattern may be slightly greater or slightly smaller than the size of the metal bridge. For example, if the size of the blocking pattern is slightly greater than the size of the metal bridge and the metal bridge can be blocked by the blocking pattern, the metal bridge can be caused to be invisible. Of course, luminance of an entire apparatus will be probably affected to a certain extent because light emitted from the LCD module will be probably intercepted by a portion, beyond the metal bridge, of the blocking pattern to certain extent. If the size of the blocking pattern is slightly smaller than the size of the metal bridge, the metal bridge can be caused to be at least substantially invisible and the light emitted from the LCD module will not be blocked by the blocking pattern. Of course, if the shape and the size of the blocking pattern are the same as the shape and the size of the metal bridge, the metal bridge can be caused to be invisible while the display screen has the same effect as that having no blocking pattern when an entire apparatus is in an illuminated state.

It is to be noted that in the abovementioned embodiments, the touch identification pattern formed of the ITO material is taken as an example for description, but in fact other materials may also be adopted to manufacture the touch identification pattern in the embodiments of the present invention, and thus the material of the touch identification pattern is not limited to the ITO material.

The OGS type touch screen is taken as an exemplary example for description in the foregoing, but the touch sensor according to the embodiments of the present invention may also be applied to an on-cell type touch screen and an in-cell type touch screen.

For example, for the on-cell type touch screen, the blocking pattern is simultaneously formed while a black light blocking layer, i.e. a BM, is formed on the protective glass by photolithography. The blocking pattern is positioned such that a region of the metal bridge is covered by the blocking pattern, so that the metal bridge is caused to be invisible.

For the in-cell type touch screen, when the touch sensor is formed inside the screen, the blocking pattern is simultaneously formed while a black light blocking layer, i.e. a BM, is formed by photolithography. The blocking pattern is positioned such that a region of the metal bridge is covered by the blocking pattern, so that the metal bridge is caused to be invisible.

The solutions according to embodiments of the present invention are applicable to not only the abovementioned situations, but also to products such as a touch screen having a metal mesh.

For the touch screen having the metal mesh, likewise, when a BM layer is formed, a blocking pattern may be simultaneously formed in a sensor region (the blocking pattern has the same line width and shape as the metal mesh), so that the metal mesh can be caused to be invisible. Likewise, a material of the blocking pattern may be a black photoresist or a low-reflectivity material such as Cr, CrO, or the like.

According to the embodiments of the present invention, the blocking pattern is added at a position corresponding to the metal bridge, and thus the metal bridge is invisible after it is attached. In addition, according to the embodiments of the present invention, a low-resistance characteristic of the metal material is retained without need of any consideration of a high reflectivity of the metal. Furthermore, according to the embodiments of the present invention, the process is simple and the cost is low. In summary, the embodiments of the present invention provide a touch sensor, a method of manufacturing the touch sensor, and a touch screen and an electronic product which include the touch sensor. In the touch sensor, the blocking pattern is disposed in the position corresponding to the metal bridge, so as to solve problems of light reflection and dizzy property of the metal bridge, and a manufacturing process is simple. When the same material as that of the BM frame is selected for the blocking pattern, the blocking pattern can be manufactured without changing an existing process. Furthermore, the solutions according to embodiments of the present invention are applicable to not only the abovementioned situations, but also products such as a touch screen having a metal mesh.

Embodiments of the present invention is to provide a touch sensor, a method of manufacturing the touch sensor, and a touch screen and an electronic product which include the touch sensor, thereby, for example an influence of the metal bridge on the visual effect can be at least partly eliminated.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:

1. A touch sensor comprising:
   a substrate;
   a blocking pattern disposed on the substrate; and
   a metal bridge,
   wherein the blocking pattern is disposed in a region corresponding to the metal bridge on the substrate and is configured to block the metal bridge, and
   an orthogonal projection of the metal bridge on the substrate is a first orthogonal projection, an orthogonal projection of the blocking pattern on the substrate is a second orthogonal projection, and the first orthogonal projection is located within a range of the second orthogonal projection.

2. The touch sensor of claim 1, wherein:
   the blocking pattern is formed of a black photoresist or a black metal oxide material.

3. The touch sensor of claim 1, the touch sensor further comprising:
   a black matrix frame disposed on the substrate, located in the same layer as the blocking pattern, and formed of the same material as the blocking pattern.

4. The touch sensor of claim 1, wherein:
   both a shape and a size of the blocking pattern are the same as a shape and a size of the metal bridge.

5. The touch sensor of claim 1, further comprising:
a touch identification pattern, wherein the touch identification pattern is disposed on the blocking pattern and on a portion of the substrate which is not covered by the blocking pattern, and comprises a first wiring and a second wiring which cross each other at a crossing; and
a first transparent insulating layer disposed on a portion of the first wiring corresponding to the metal bridge,
wherein the metal bridge is disposed at the crossing of the first wiring and the second wiring on the first transparent insulating layer to connect wiring segments of the second wiring which are separated at the crossing.

6. The touch sensor of claim 5, further comprising:
a second transparent insulating layer disposed over the touch identification pattern and the metal bridge.

7. A method of manufacturing the touch sensor of claim 1, the method comprising:
forming the blocking pattern on the substrate; and
forming the metal bridge blocked by the blocking pattern.

8. The method of claim 7, wherein:
the method further comprises: forming a black matrix frame on the substrate, before the forming the blocking pattern on the substrate, or between the forming the blocking pattern on the substrate and the forming the metal bridge.

9. The method of claim 8, wherein:
the forming the metal bridge comprises:
forming the metal bridge on the blocking pattern, and the method further comprises:
forming a first transparent insulating layer on the metal bridge; and
forming a touch identification pattern on the first transparent insulating layer and on a portion of the substrate which is not covered by the first transparent insulating layer, wherein the touch identification pattern comprises a first wiring and a second wiring which cross each other at a crossing, and the metal bridge is disposed at the crossing of the first wiring and the second wiring to connect wiring segments of the first wiring which are separated at the crossing.

10. The method of claim 9, further comprising the step of:
forming a second transparent insulating layer on the touch identification pattern.

11. The method of claim 8, further comprising:
forming a touch identification pattern on the blocking pattern and on a portion of the substrate which is not covered by the blocking pattern before the forming the metal bridge, the touch identification pattern comprising a first wiring and a second wiring which cross each other at a crossing; and
forming a first transparent insulating layer on a portion of the first wiring corresponding to the metal bridge,
wherein the forming the metal bridge comprises forming the metal bridge at the crossing of the first wiring and the second wiring on the first transparent insulating layer to connect wiring segments of the second wiring which are separated at the crossing.

12. The method of claim 7, wherein:
the black matrix frame is formed while the blocking pattern is formed on the substrate, and the black matrix frame is formed of the same material as the blocking pattern.

13. The method of claim 12, wherein:
the forming the black matrix frame while the blocking pattern is formed on the substrate comprises:
applying a black photoresist material to the substrate to form a black photoresist material layer; and
forming a black photoresist pattern by exposing and developing processes,
wherein the black photoresist pattern comprises a black photoresist-retained region comprising the black matrix frame and the blocking pattern, and a black photoresist-removed region.

14. A touch screen comprising:
the touch sensor of claim 1, an optical clear resin/optical clear adhesive layer, and a liquid crystal display module which are arranged in sequence.

15. The touch screen of claim 14, wherein:
the touch screen is a one-glass solution type touch screen, an on-cell type touch screen, or an in-cell type touch screen.

16. An electronic product comprising:
the touch screen of claim 14.

17. A touch sensor comprising:
a substrate;
a blocking pattern disposed on the substrate;
a metal bridge, wherein the blocking pattern is disposed in a region corresponding to the metal bridge on the substrate and is configured to block the metal bridge;
a first transparent insulating layer disposed on the metal bridge; and
a touch identification pattern, wherein the touch identification pattern is disposed on the first transparent insulating layer and on a portion of the substrate which is not covered by the first transparent insulating layer, and comprises a first wiring and a second wiring which cross each other at a crossing, wherein the metal bridge is disposed at the crossing of the first wiring and the second wiring to connect wiring segments of the first wiring which are separated at the crossing.

18. The touch sensor of claim 17, further comprising:
a second transparent insulating layer disposed over the touch identification pattern.

19. The touch sensor of claim 17, wherein:
the touch identification pattern is formed of an indium tin oxide material.

20. A touch screen comprising:
the touch sensor of claim 17, an optical clear resin/optical clear adhesive layer, and a liquid crystal display module which are arranged in sequence.

* * * * *